(12) United States Patent
York

(10) Patent No.: US 9,681,776 B2
(45) Date of Patent: Jun. 20, 2017

(54) ADAPTER FOR A SLOW COOKER

(76) Inventor: Diana L. York, Midlothian, TX (US)

(*) Notice: Subject to any disclaimer, the term of this patent is extended or adjusted under 35 U.S.C. 154(b) by 3113 days.

(21) Appl. No.: 11/973,949

(22) Filed: Oct. 11, 2007

(65) Prior Publication Data

US 2009/0095169 A1    Apr. 16, 2009

(51) Int. Cl.
A47J 39/00    (2006.01)
A47J 27/00    (2006.01)
A47J 36/16    (2006.01)

(52) U.S. Cl.
CPC ............. A47J 39/00 (2013.01); A47J 27/004 (2013.01); A47J 36/16 (2013.01)

(58) Field of Classification Search
CPC ........... A47J 39/00; A47J 36/16; A47J 27/004
USPC ......... D7/330, 331, 339, 350–367, 378–379, D7/538, 546, 541, 542; 99/330, 337–339, 99/340, 400, 401, 403–418, 444–450; 126/390.1, 376.1, 378.1, 20, 369, 369.1; 220/225, 574, 573.1, 573.4, 573.5, 507, 220/4.01, 4.24
See application file for complete search history.

(56) References Cited

U.S. PATENT DOCUMENTS

| | | | |
|---|---|---|---|
| 590,212 A | 9/1897 | Daesch | |
| 712,793 A | 11/1902 | Henis et al. | |
| 1,470,199 A | 10/1923 | Small | |
| 1,613,671 A | 1/1927 | O'Donnell | |
| 1,630,787 A | 5/1927 | Cullen | |
| 1,958,978 A | 5/1934 | Thomas | 53/2 |
| 2,048,572 A | 7/1936 | Smith | 53/2 |
| D152,618 S | 11/1949 | Ulmer | D44/1 |
| D260,958 S | 9/1981 | Nishikawa | D7/94 |
| 4,646,628 A * | 3/1987 | Lederman | 99/413 |
| 4,790,292 A * | 12/1988 | Kuhn | 219/621 |
| 5,031,519 A * | 7/1991 | Toida et al. | 99/340 |
| 5,092,229 A * | 3/1992 | Chen | 99/337 |
| D347,354 S | 5/1994 | Naft | D7/354 |
| 5,865,098 A | 2/1999 | Anelli | 99/331 |
| 6,274,847 B1 * | 8/2001 | Hlava et al. | 219/433 |
| 6,298,775 B1 * | 10/2001 | Chen | 99/422 |
| 6,305,272 B1 * | 10/2001 | Lin | 99/371 |
| 6,373,031 B1 * | 4/2002 | Barrow | 219/432 |
| D459,144 S | 6/2002 | Brady | D7/354 |
| 6,653,602 B2 | 11/2003 | Li | 219/432 |
| 6,884,971 B2 * | 4/2005 | Li | 219/436 |
| 6,963,051 B2 * | 11/2005 | You | 219/436 |
| 6,964,224 B2 * | 11/2005 | Minamigawa | 99/403 |
| 6,987,247 B2 | 1/2006 | Schaffeld et al. | 219/438 |
| 7,086,326 B2 * | 8/2006 | Yokoyama | 99/413 |
| 2002/0185012 A1 * | 12/2002 | Yokoyama | 99/413 |
| 2004/0083904 A1 | 5/2004 | Wei-Wen | 99/448 |
| 2006/0249504 A1 * | 11/2006 | Kaney et al. | 219/435 |

* cited by examiner

Primary Examiner — Quang D Thanh
Assistant Examiner — Joseph Iskra
(74) Attorney, Agent, or Firm — James R. Gourley; Carstens & Cahoon, LLP

(57) ABSTRACT

An adapter for a slow cooker having one or more basins for food items and a perimeter configured to fit an upper rim of the slow cooker and also receive the cover of the slow cooker such that the original closure seal of the cover to the slow cooker is maintained. Another embodiment comprises at least first and second identically shaped trays configured to nest in side-by-side fashion when supported within the slow cooker.

11 Claims, 6 Drawing Sheets

ADAPTER FOR A SLOW COOKER

BACKGROUND OF THE INVENTION

1. Field of the Invention

The present invention generally relates to cooking pots of various types and more particularly to accessory devices for cooking a plurality of foods in separate trays within one type of cooking pot called a slow cooker.

2. Background and Description of the Prior Art

A variety of cooking vessels are available for cooking meals in an oven, on a stove burner, or as a stand-alone appliance having a self-contained heat source. Traditional vessels include pans or roasters with lids that must be placed on or in a source of heat. Electric cooking pots are well known devices that typically contain a heating element built in to the bottom of the pot. A lid or cover is provided to contain the heat and much of the humidity while cooking. Controls for adjusting or regulating the temperature and cooking duration are generally provided, ranging from a simple "High" and "Low" switch to programmable controls and timers. While conventional cooking pots typically have a single compartment for cooking, some types are available with inserts or accessories for keeping foods separated during cooking, for steaming, and the like.

Another type of vessel is the slow cooker. A slow cooker is constructed for use as a stand alone cooking device. It is characterized by a built-in heating element embedded in the walls and bottom of the vessel so as to surround the contents of the vessel as completely as possible. This construction facilitates the uniform application of heat to the contents to obtain the benefits of slowly cooking the food placed in the vessel. However, slow cookers heretofore available have the deficiency of not being able to slowly cook several different foods at the same time in the same vessel. Further, the inserts—various types of vessels, receptacles, and supporting devices—disclosed in the prior art for use with other types of cooking pots are not readily adaptable because of structural limitations that do not take into account the specific structural and functional attributes of slow cookers. These attributes include the need to maintain a close seal at the closure between the rim of the vessel and the lid. Further, the walls of a slow cooker tend to be thicker because of the embedded heating elements and are thus less amenable to changes in configuration to adapt them to various kinds of insert vessels or receptacles. Thus, the inserts provided with conventional cooking vessels are not suitable for slow cookers.

Some examples of prior art insert devices for cooking pots include the following. U.S. Pat. No. 590,212 issued to Daesch describes a semicircular inner vessel that is suspended from a pair of ears disposed on opposite, upper sides of the vessel and which fit into corresponding slots provided in the wall of the outer vessel. U.S. Pat. No. 712,793 issued to Henis & Jamison discloses a detachable frame that rests on the rim of an open vessel for suspending one or more insertable vessels within the open vessel. U.S. Pat. No. 1,470,199 issued to Small requires a stepped, annular shoulder formed in the wall of the metal pot for supporting semicircular insert trays and a vertical, full-height partition secured to the bottom and sides of the pot. U.S. Pat. No. 1,613,671 issued to O'Donnell describes an insert vessel for suspending on clamps disposed around the outside of the insert vessel that engage the upper rim of a an open saucepan or kettle. U.S. Pat. No. 1,639,787 issued to Cullen discloses a full-depth, generally triangular receptacle having a curved outer wall reinforced by an inverted, curved channel for suspending the receptacle from the like-curved upper rim of a cooking pot. A handle extends outward from the outer side of the curved channel. The receptacle is configured so that four such receptacles may be used in the cooking pot.

U.S. Pat. No. 1,958,978 issued to Thomas describes a double-walled, pan-like insert frame for a steam cooker wherein a first wall of the frame is configured to rotate several degrees within a second wall of the frame against the tension of several springs disposed circumferentially within and between the rims of the first and second walls. The first and second walls have round, slightly offset openings in the bottom portion for receiving small round receptacles therein and gripping them in position in the frame. The frame, having an out-turned edge, is suspended within the steam cooker from the rim of the steam cooker. A cover is configured to fit the rim of the insert frame, which differs in cross section from the rim of the steam cooker because of the construction of the insert frame. U.S. Pat. No. 2,048,572 issued to Smith recites a one-piece insert receptacle for a large receptacle or roasting pan for use in an oven or placed in contact with some other external heat source. The insert may include several small, separate receptacles surrounding a larger central receptacle formed therein. The insert rests on the bottom of the pan and includes a pair of bail-like handles extending inward from the central receptacle for lifting. U.S. Pat. No. 4,646,628 issued to Lederman discloses a bucket-like pan modified to have three notches in its rim spaced at equal intervals around the rim. A wire rack having three outward-extending arms located to be placed within the notches provides a frame for suspending individual receptacles within the pan.

U.S. Pat. No. 5,865,098 issued to Anelli describes a slow cooker housing having two or more individual cavities for receiving separate cooking containers heated by separate elements. The heating elements are controlled by a keyed mechanism when a container that is at least partially filled is inserted in one of the cavities. The keyed mechanism enables disabling an individual, unfilled container. Each container has a separate lid. U.S. Pat. No. 6,653,602 issued to Li describes a roasting oven having an outer housing and an inner liner, and further having a collapsible rack that rests on the rim of the inner liner of the roasting oven. Individual cooking, serving, or storage containers are supported in openings in the rack. U.S. Design Pat. No. Des. 156,184 issued to Ulmer illustrates the ornamental design of a circular, sauce pan-like food warming rack that supports three separate containers within it. U.S. Design Pat. No. Des. 347,354 issued to Naft illustrates the ornamental design of a semicircular tray with a perforated bottom for a steaming appliance. U.S. Patent Application Publication No. 2004/0083904 filed by Wei-Wen discloses an inner pot or liner for a roasting oven that receives and supports separate 'steaming boxes' without the need of a separate pallet or frame, wherein the inner liner itself is supported by the edge of the roasting oven vessel.

Other slow cookers represented in the prior art include U.S. Pat. No. 6,963,051 issued to You describes a single-cavity slow cooking inner vessel having an insulated outer vessel surrounding the inner vessel and heating source. U.S. Pat. No. 6,987,247 issued to Schaffeld et al. discloses a portable, single-cavity slow cooker having a sealing apparatus, which cooperates with a handle-and-latch mechanism, to prevent spills or leakage between the lid and the vessel. U.S. Design Pat. No. Des. 260,958 issued to Nishikawa illustrates the ornamental design for a double well slow cooker that combines two separate slow cookers in a common housing. U.S. Design Pat. No. D459,144 issued to Brady illustrates the ornamental design for an insert basin for a slow cooker having a lateral, outward extending lip disposed around its upper rim.

As evidenced by the foregoing review of items of the prior art, all of them have the deficiency of having features that impair the closure of the lid and the vessel or require modifications to the cooking vessel. Thus, presently available slow cookers would require structural modifications to be made to the cooking vessel itself or to its lid, which tends to increase their cost to manufacture, or which complicates a conversion or adaptation of an existing slow cooker because of its particular structure. What is needed is a solution that provides a slow cooker with one or more basins or compartments without necessitating structural modifications to the slow cooker vessel or its lid and which do not impair the closure or fit of the slow cooker's lid with the vessel.

SUMMARY OF THE INVENTION

Accordingly, to overcome these and other deficiencies in the prior art there is disclosed an adapter for a slow cooker, comprising a tray for food items defined therewithin and further having a perimeter cross section configured to fit an upper rim of a slow cooker and to receive a cover of the slow cooker when the tray is placed upon the upper rim of the slow cooker, and when the cover of the slow cooker is placed on the tray, such that the original closure seal of the cover to the slow cooker is maintained.

In other aspects of the present invention, the tray may include one or more basins extending substantially to the perimeter of the tray, first and second handles extending from opposite sides of the tray, and have a perimeter cross section configured to rest on or fit closely with the shape of the upper rim of the slow cooker. In another aspect, a vent passage or vent groove may be placed through a wall of or along an outer surface of the tray near the perimeter of the tray.

Further, in another embodiment an adapter assembly for a slow cooker is disclosed comprising at least first and second identically shaped trays having substantially vertical walls configured to nest in side-by-side fashion when supported within a slow cooker to form a composite array for providing a divided cooking area, wherein each tray includes a curved outside wall opposite a straight inside wall attached to the curved wall at respective ends thereof, the inside wall further including at a first location a laterally extending lifting loop protruding therefrom and a laterally extending indentation in the inside wall at a second location adjacent to the loop, such that the loop of one tray is received within the indentation of a second tray when the first and second trays are nested together.

In other aspects of the adapter assembly embodiment, a stand configured for placement inside the slow cooker to rest on the bottom thereof may be provided for supporting the insert assembly thereon. In an alternative embodiment a supporting ledge may be provided at selected locations around the inside surface of the slow cooker. A spring wire handle formed of metal or plastic may be provided to enable lifting an insert.

In another embodiment, the adapter assembly comprises first, second and third identically shaped trays having substantially vertical walls and configured to nest in side-by-side fashion when supported within a slow cooker to form a composite array for providing a divided cooking area, wherein each tray includes a curved outside wall opposite at least first and second straight inside walls adjacent to the curved wall at respective ends thereof, the inside walls joining each other at an angle of approximately 120° at opposite ends thereof and further including at their joining a lateral lifting loop protruding inward therefrom.

DETAILED DESCRIPTION OF THE INVENTION

Figure 1:
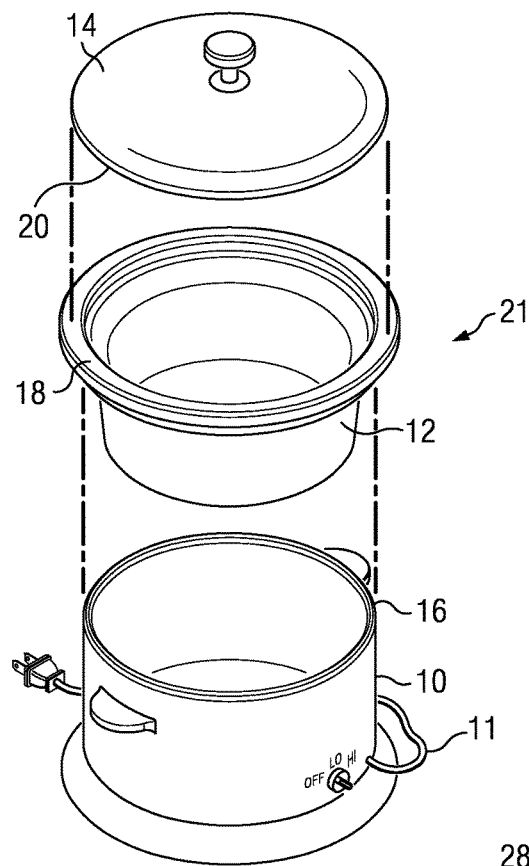
FIG. 1 illustrates a prior art slow cooker.

The embodiments of the present invention described herein are not intended to be limiting but to illustrate the principles of the application of the invention. The disclosed embodiments illustrate two types of adapters for slow cookers, including an adapter configured as a single tray and another adapter configured as a plurality of nested trays. Both embodiments preserve the closure seal of the cover to the cooking vessel of the slow cooker. Neither embodiment requires any modification to the slow cooker other than simply inserting it into position as described. In the following description, like reference numbers will be used to refer to the identical structures that appear in the drawings.

Referring to FIG. 1 there is illustrated a prior art slow cooker of the type that is susceptible of being improved by the use of the present invention. The slow cooker 21 includes a base 10 having a rim 16, an inner liner 12 having an upper rim 18, and a cover 14 having an outer edge 20 configured to fit conformably against or with the upper rim 18 of the inner liner 12. (The upper rim 18 may be referred to as simply the "rim 18" in the description that follows.) The upper rim 18 of the inner liner 12, when the inner liner 12 is installed into the base 10 and supported by the rim 16, thus forms the upper rim 18 of the assembled slow cooker 21. The configuration of the outer edge 20, including its underside, of the cover 14 forms a closure seal that ensures retention of substantially all of the heat and moisture within the slow cooker 21 when the cover 14 is placed on the upper rim 18 of the slow cooker 21. The base 10 of the slow cooker 21 includes heating elements (not shown in this figure, as such heating elements are well understood in the art) in its walls and bottom, which is the defining characteristic of a slow cooker. The heating elements are typically powered by electricity supplied via a power cord 11.

Figure 2:
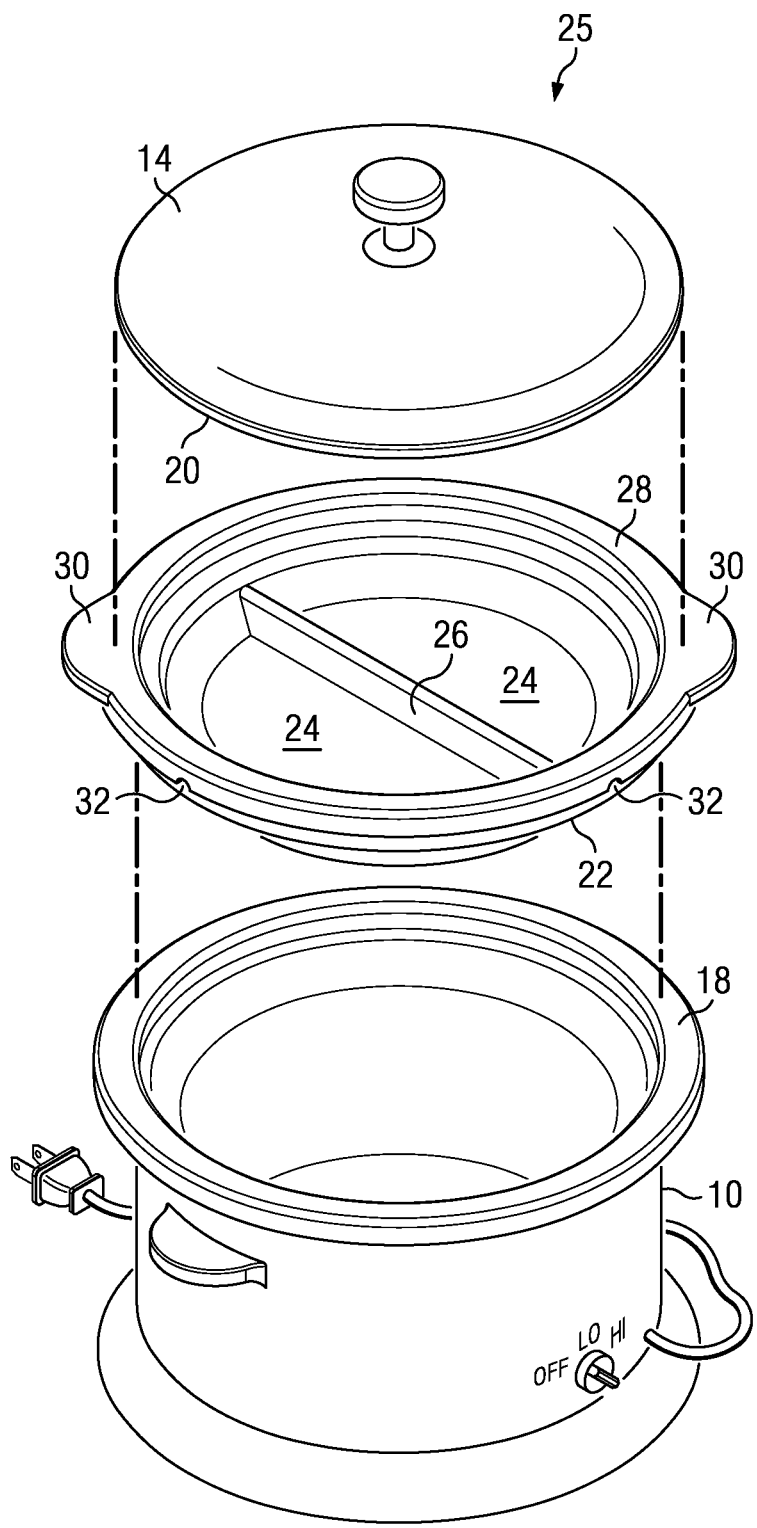
FIG. 2 illustrates an adapter for a slow cooker configured as a single tray according to a first embodiment of the present invention.

Referring to FIG. 2 there is illustrated a slow cooker 25 with an adapter configured as a single tray according to a first embodiment of the present invention. The slow cooker 25 is similar to the slow cooker 21 shown in FIG. 1 except that the liner 12 has been assembled with the base 10 as the slow cooker 25 would normally be used. Shown between the assembled slow cooker 10/12 and the cover 14 is an adapter 22 configured as a single tray. The adapter 22, also known as tray 22 herein, forms a basin 24, which may be configured as a pair of basins 24, 24 disposed side-by-side as shown, separated by a partition 26. The height of the partition 26 is a variable dimension and may be specified to extend upward from the floor or bottom of the tray 22 partially or fully to the level of the upper rim 28 of the tray 22. Alternate tray embodiments may be partitioned into three or more separate basins 24. The tray 22 may also be configured as a single basin 24 without the partition 26. The tray 22 includes a tray rim 28 upon which the cover 14 may be placed. (The tray rim 28 may be referred to as simply the "rim 28" in the description that follows.) The tray 22 may further include a pair of handles 30 extending from the perimeter of the tray on opposite sides of the tray 22. In the example shown, the handles have the form of tab-like extensions of the upper portion of the perimeter of the tray 22. The tray 22 may further include along an underside of the perimeter of the tray one or more vents 32 provided to vent the interior of the slow cooker 25 to the outside of the slow cooker 25. The vent 32 may be formed as a groove along the underside surface of the tray 22 at its perimeter. Alternatively, the vent 32 may be formed as an orifice (not shown, but in the same approximate location as the vent groove 32) through the tray 22 material from under the tray 22 to the upper side of the tray 22. Several vent grooves 32 may be disposed at substantially equal intervals around the outer portion of the tray 22.

The tray 22 may be preferably fabricated of heat resistant glass such as borosilicate glass that combines 5% or more Boric acid ($B_2O_3$) with the usual composition of sand ($SiO_2$), soda ash ($Na_2CO_3$), and lime ($CaCO_3$). A typical well-known borosilicate glass is Pyrex, manufactured by the Corning Glass Works, Pittsburg, Pa. Other suitable heat resistant whiteware ceramic and thermosetting plastic materials having thermal properties suitable for continuous use at temperatures up to at least 400° F., may also be used. For example, so-called whiteware ceramic materials include stoneware, porcelain, earthenware, and bone china. Examples of thermosetting plastic materials include Ultem® and Extem® available from the General Electric Co. The tray 22 may be fabricated by molding or pressing or other processes used for manufacturing oven cooking ware such as baking dishes and the like. Such fabrication techniques are well-known in the industry and need not be described further herein.

Figure 3:
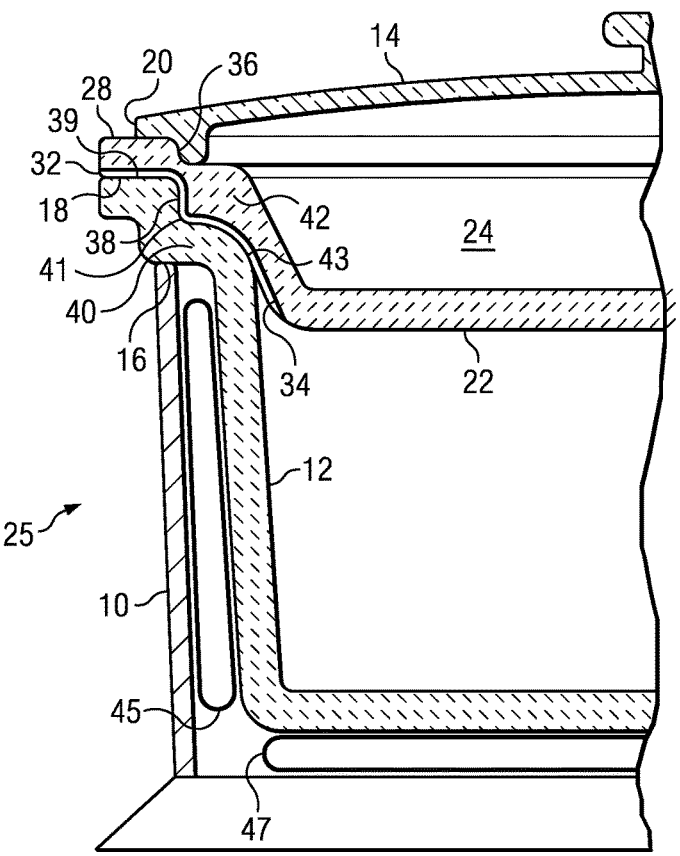
FIG. 3 illustrates a side cross section view of the embodiment of FIG. 2 showing a closure seal formed between the adapter and the slow cooker and between the cover for the slow cooker and the adapter.

Referring to FIG. 3 there is illustrated a side cross section view of the embodiment of FIG. 2 as installed in the slow cooker 25. The slow cooker 25 includes the base 10, an inner liner 12 having an upper rim 18, an adapter tray 22 having an upper rim 28 and a cross section configured to have the same profile as the profile of the inner liner 12. The cover 14 having an outer edge 20 is similarly configured to fit conformably against or with the upper rim 28 of the adapter tray 22. The adapter tray 22 is shown as having a relatively shallow depth in FIG. 3. However, the depth dimension is a variable that may be adjusted according to the specific application or slow cooker.

FIG. 3 further shows a closure seal formed between the adapter tray 22 and the upper rim 18 of the liner 12 of the slow cooker 25 and between the cover 14 for the slow cooker 25 and the rim 28 of the adapter tray 22. It should be noted that the rim 18 of the inner liner 12 of FIG. 1, which has the form of a stepped cross section, is the same as the rim 18 of the slow cooker 25 of FIG. 2 when the inner liner 12 is assembled into the base 10 of the slow cooker 25. The term "closure seal" is used to define the conformal contact relationship between the cover 14 and the rim 18 of the slow cooker 25 or the rim 28 of the adapter tray 22. This term may also refer to the conformal contact relationship between the adapter tray 22 and the rim 18 of the slow cooker. Thus, a closure seal is formed by the lower and upper surfaces of the perimeter of the tray respectively between the tray and the upper rim of the slow cooker and between the cover and the tray. The closure seal between the adapter tray 22 and the rim 18 of the slow cooker 25 will be referred to as the tray closure seal 38. Similarly, the closure seal between the cover 14 and the rim 18 of the slow cooker or the cover 14 and the rim 28 of the adapter tray 22 will be referred to as the cover closure seal 36.

Figure 4A:
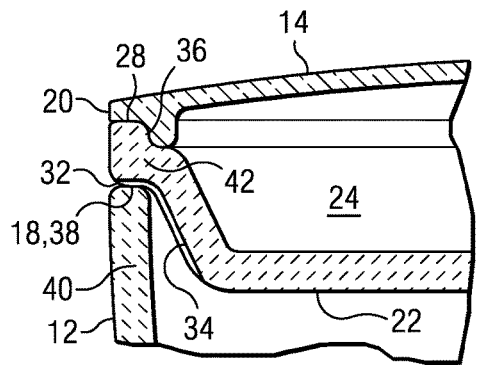
FIG. 4A illustrates an alternate configuration of the rims of the slow cooker, the adapter, and the cover of the slow cooker.

The conformal contact relationship between the respective structures identified in the foregoing is provided by maintaining the same cross section shape of the peripheral portions of the respective structures that are placed in contact when assembled together, as shown in FIGS. 3 and 4A, 4B, and 4C to be described. It is also apparent in the FIGS. 3, 4B and 4C the contact region includes the surfaces of at least two circumferential planes that join at a radiused junction of the two surfaces. In FIG. 4A there is a single contact surface between the lower surface of the perimeter of the adapter tray and the rim of the slow cooker. The contact relationship is maintained so long as manufacturing tolerances are held to a minimum practical level such that clearances between the contacting portions are substantially and uniformly zero throughout most of the regions of the peripheral rims intended to be in contact. The closure seal thus provides a substantially conforming contact relationship between the corresponding lower and upper surfaces respectively of the tray and the rim of the slow cooker and between the cover and the tray. Thus, the closure seal is defined as a substantial contact relationship between most of the surfaces intended to be in contact in the region of the peripheral rims of the respective parts. The contact relationship, however, may permit the existence of one or more small vent passages on the underside of the peripheral rim of the adapter tray 22. The contact relationship may also permit some thin, localized gaps in the fit of the surfaces intended to be in contact. Such gaps, which may exist in the closure seals associated with either the cover 14 or the adapter tray 22, may also function as vent passages, whether intentionally provided or not.

FIGS. 3, 4A, 4B, and 4C illustrate several alternative cross sections of the inner liner 12, the adapter tray 22 and the cover 14 (along with the housing 10 of the slow cooker in FIG. 3) to show how the adapter tray 22 of the present invention may be implemented, particularly to illustrate how the closure seal may be maintained in different slow cooker designs. The examples shown are not exhaustive, but are presented to show that the invention is adaptable to different slow cooker designs. It is also shown in FIGS. 3, 4A, 4B, and 4C that the cross section of the cover 14 illustrated in each of the figures has a cross section at the peripheral rim that matches the cross section of the rim of the slow cooker 25. Thus, when the adapter tray 22 is removed, the cover 14 fits the slow cooker 25 with the requisite closure seal.

In some embodiments, as illustrated in FIGS. 3, 4A, 4B, and 4C, a vent passage to be described is provided in the underside of the contact surface of the rim of the tray. The vent passage may be provided at one or more locations around the circumference of the tray. The vent passage may be a small groove having a generally semicircular or rectangular cross section wherein the cross sectional area is typically in the range of 1 to 5 square millimeters ($mm^2$) but is not necessarily limited to that range. Persons skilled in the art will appreciate that the vent feature, when provided, may be provided by other forms of intentional interruptions such as thin, localized gaps in the contact relationship that provide for the passage of steam or vapor or heated air, etc. from within the slow cooker to prevent an the increase of pressure beyond a safe level.

Continuing with FIG. 3, the cover closure seal 36 and the adapter tray closure seal 38 have been described. The vent passage 32, 34 shown between the rim 28 of the adapter tray 22 and the rim 18 of the slow cooker 25. The reference numbers 40 and 42 refer respectively to the material cross sections of the liner 12 of the slow cooker 25 and of the adapter tray 22 in their respective peripheral regions. In the view of FIG. 3, the peripheral regions have a stepped configuration in cross section wherein three surfaces located at 39, 41, and 43 of the respective peripheral rims, joined together through a radiused junction along their common circumference, are in a substantial contact relationship to form the closure seal between the adapter tray 22 and the rim 18 of the slow cooker 25. FIG. 3 further illustrates the approximate location of first and second heating elements 45, 47 in the slow cooker 25.

Referring to FIG. 4A there is illustrated an alternate configuration of the rims of the slow cooker 25, the adapter 22, and the cover 14 of the slow cooker 25. In this embodiment, the inner liner 12 of the slow cooker 25 has a straight, vertical cross section that is mimicked by the cross section of the adapter tray 22, so that the rim 20 of the cover 14 fits upon the rim 42 of the adapter tray 22 in the same way as it fits upon the rim 40 of the inner liner 12 of the slow cooker 25, in either case providing the substantial contact relationship.

Figure 4B:
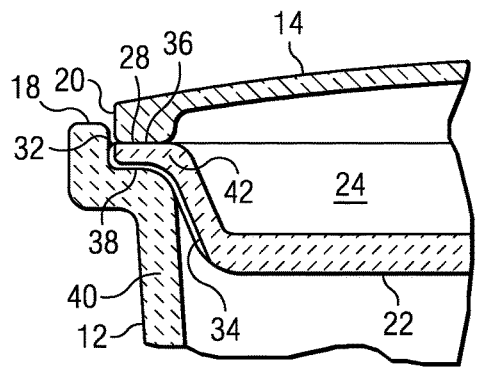
FIG. 4B illustrates a second alternate configuration of the rims of the slow cooker, the adapter, and the cover of the slow cooker.

Referring to FIG. 4B there is illustrated a second alternate configuration of the rims of the slow cooker 25, the adapter 22, and the cover 14 of the slow cooker 25. In this embodiment, the inner liner 12 of the slow cooker 25 has a modified stepped cross section that is mimicked by the cross section of the adapter tray 22, so that the rim 20 of the cover 14 fits upon the rim 42 of the adapter tray 22 in the same way as it fits upon the rim 40 of the inner liner 12 of the slow cooker 25, in either case providing the substantial contact relationship.

Figure 4C:
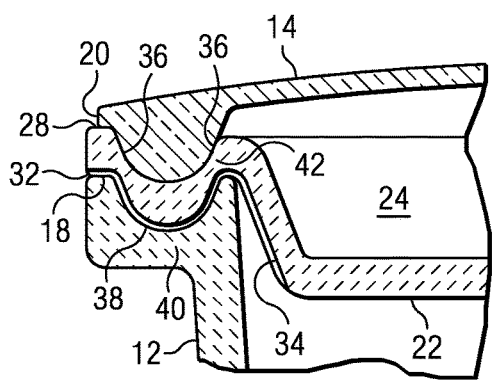
FIG. 4C illustrates a third alternate configuration of the rims of the slow cooker, the adapter, and the cover of the slow cooker.

Referring to FIG. 4C there is illustrated a third alternate configuration of the rims of the slow cooker 25, the adapter 22, and the cover 14 of the slow cooker 25. In this embodiment, the inner liner 12 of the slow cooker 25 has a Y-shaped cross section that is mimicked by the cross section of the adapter tray 22, so that the rim 20 of the cover 14 fits upon the rim 42 of the adapter tray 22 in the same way as it fits upon the rim 40 of the inner liner 12 of the slow cooker 25, in either case providing the substantial contact relationship.

Figure 5:
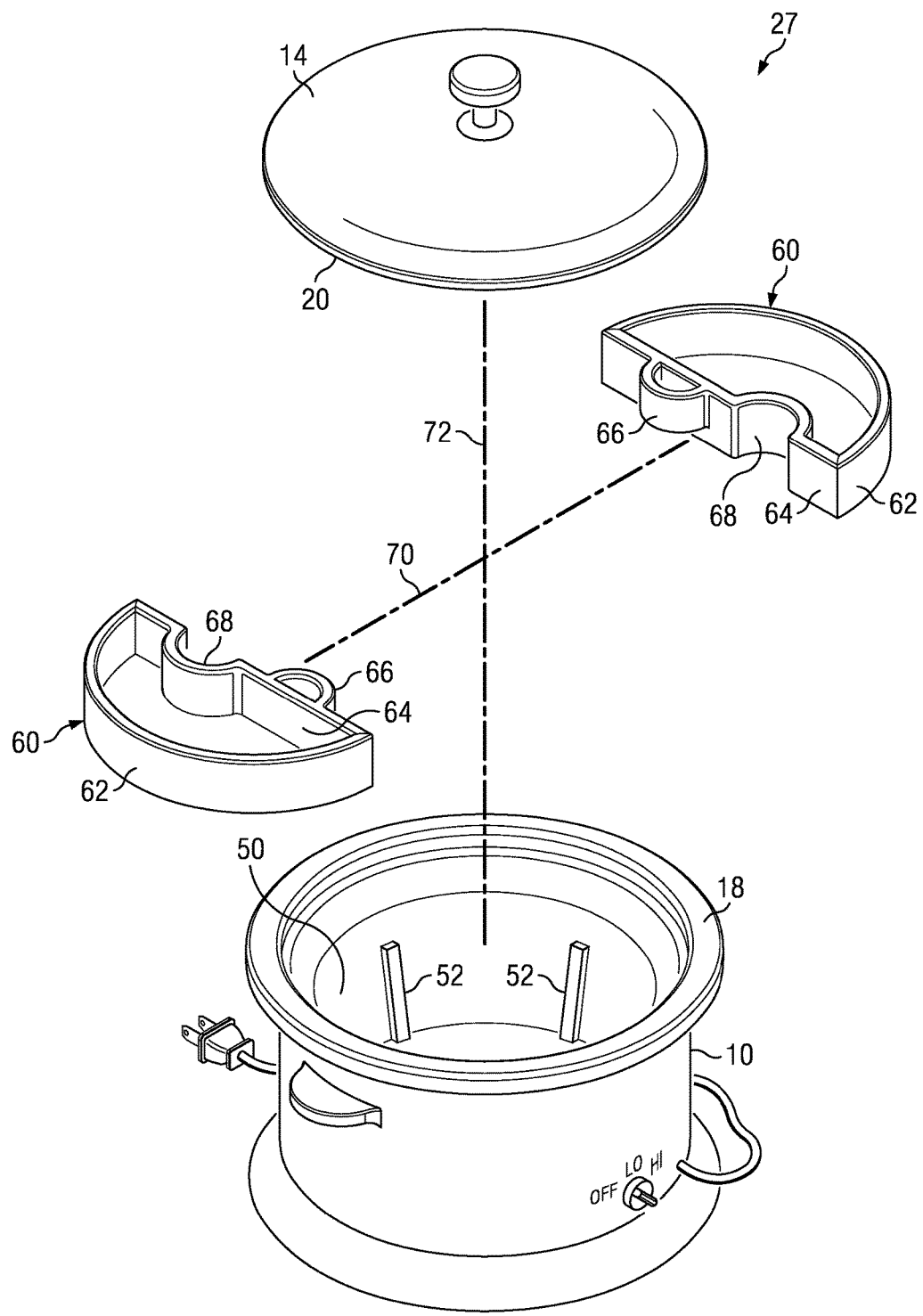
FIG. 5 illustrates an adapter for a slow cooker according to a second embodiment of the present invention configured as a pair of nesting trays.

Referring to FIG. 5 there is illustrated an adapter for a slow cooker 27 according to a second embodiment of the present invention wherein the adapter is configured as a pair of nesting trays instead of a single tray. It is apparent that FIG. 5 is similar to the view presented in FIG. 2 except that the adapter for the slow cooker is shown in a different embodiment. To the extent that the same structures appear in FIGS. 5, 6, and 7, the same reference numbers are used to refer to the same structures. In FIG. 5, the adapter is shown as a pair of identical tray inserts, both identified with the reference number 60, which will be used to refer to both tray inserts, separately or collectively. Each tray insert 60 is formed in one piece and of the same materials to provide a basin, typically by the same fabrication processes as described for the single adapter 22 previously described. Each tray insert 60 has a flat bottom, a curved outside wall 62 opposite a straight inside wall 64 attached to the curved wall 60 at respective ends thereof, the inside wall 64 further including at a first location a laterally extending lifting loop 66 protruding therefrom and a laterally extending indentation 68 in the inside wall 64 at a second location adjacent to the 66 loop. The loop 66 of one tray 60 may be received within the indentation 68 of the second tray 60 when the first 60 and second 60 trays are nested together. The nested trays 60 are shown in FIG. 6.

Figure 9:
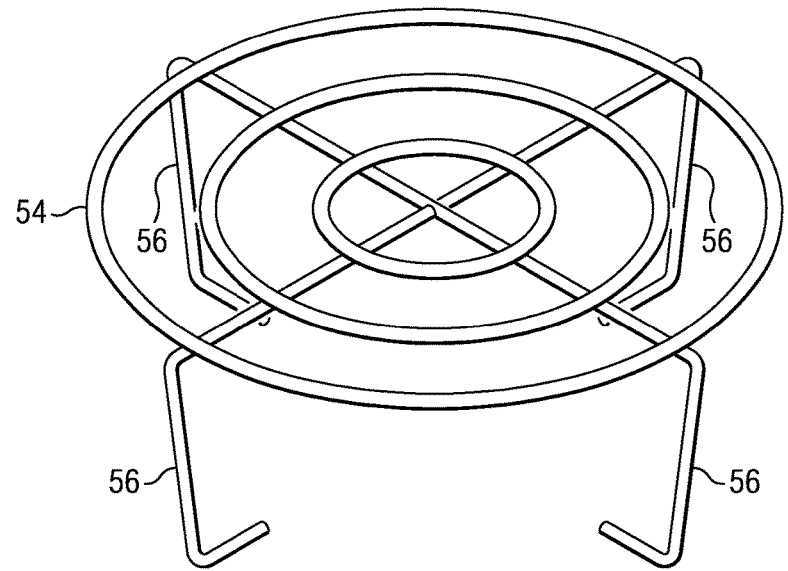
FIG. 9 illustrates a perspective view of a stand for use with the embodiments of FIGS. 5, 6, 7, and 8.

In use, the two tray inserts 60 of the adapter shown in FIG. 5 are brought together along the line 70, then lowered into position within the slow cooker 27 along the axis 72 to reset within the slow cooker 27 upon several ledges 52 disposed on the lower portion of the inner wall 50 of the slow cooker 27. Although two ledges 52 are shown in FIG. 5, in general there will be at least three such ledges 52 distributed at approximate equal angular intervals around the inner wall 50 of the interior of the slow cooker 27. The slow cooker 27 may be covered by lowering the cover 14 along the axis 72 until it is in place to form a complete assembly. It will be appreciated that the nested tray inserts 60 as installed in the slow cooker 27 permit the cover 14 of the slow cooker 27 to be placed in its normal position such that the closure seal of the cover 14 to the rim of the slow cooker 27 is maintained. An alternate support for the pair of nested tray inserts 60 may be provide as a separate stand 54 formed of wire as illustrated in FIG. 9 to be described.

Figure 6:
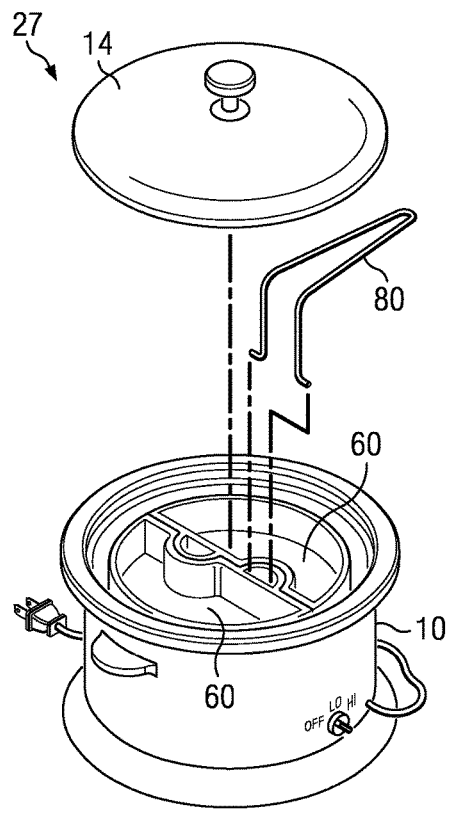
FIG. 6 illustrates the embodiment of FIG. 5 installed in the slow cooker and the use of a resilient handle for lifting and handling a tray of the nested tray embodiment of the present invention.

Referring to FIG. 6 there is illustrated the embodiment of FIG. 5 installed in the slow cooker and the use of a resilient handle 80 (i.e., a tong 80) for lifting and handling a tray insert 60 of the nested tray embodiment of the present invention. The resilient handle 80 may be a U-shaped tong having first and second legs each approximately six to eight inches long formed by bending the resilient wire during fabrication around a radius of approximately one-half inch or 1.25 cm, wherein the first and second legs are disposed approximately two inches apart at their open (i.e., distal) ends, a distance that is not critical. The distal ends preferably include "feet" formed therein by bending each end at a right angle approximately one-half inch or 1.25 cm from the distal ends of each respective first and second leg as shown in FIG. 6. In use, the resilient handle 80 may be grasped in a person's hand near the bent end, squeezed slightly, in the distal ends or "feet" inserted into the open portion of the protruding loop of a tray insert 60 to be lifted.

Figure 7:
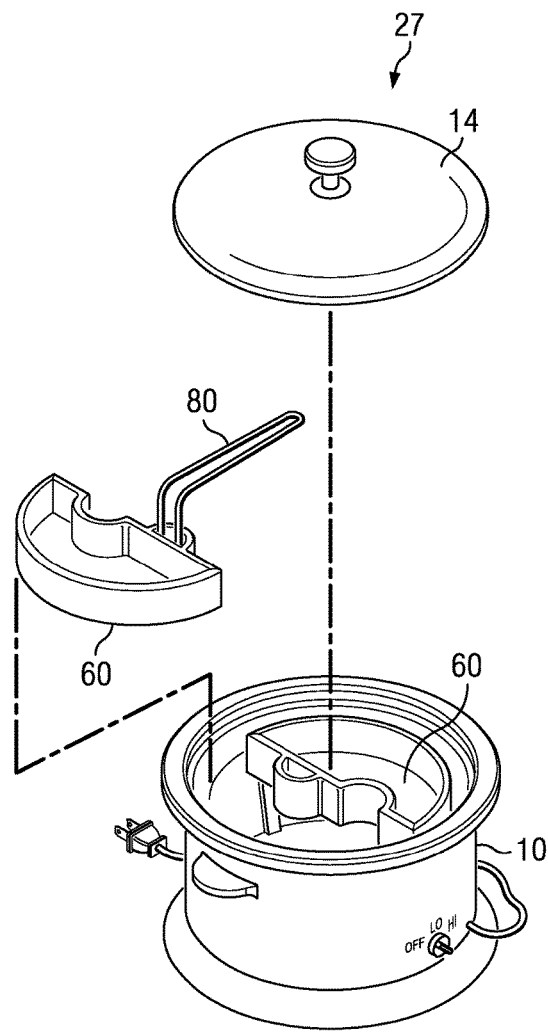
FIG. 7 illustrates a further use of the handle illustrated in FIG. 6.
Figure 10:
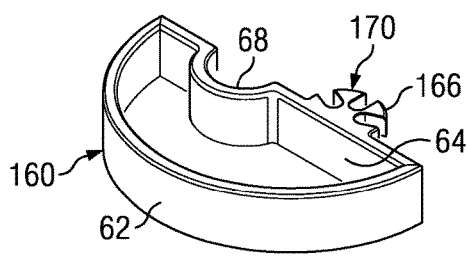
FIG. 10 illustrates an alternate embodiment of a tray insert for the embodiment of FIGS. 5, 6, and 7.
Figure 11:
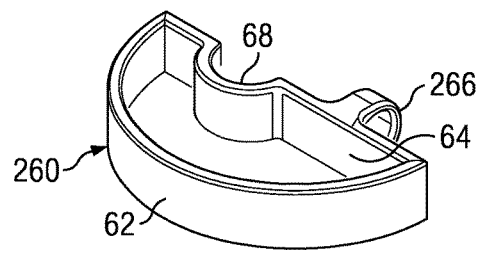
FIG. 11 illustrates another alternate embodiment of a tray insert for the embodiment of FIGS. 5, 6, and 7.

In an illustrative, alternate embodiment of the nested tray inserts 60, the loop 66 may be configured for connection to another type of lifting handle than the resilient handle 80 (or tong 80) shown in FIGS. 6 and 7. For example, as shown in FIG. 10 to be described, the loop portion may be formed without the opening therein but configured with notches or other features for receiving a handle configured to attach to the notch features for lifting. In such embodiment, the alternate to the laterally extending loop 66 is called a laterally extending member. In yet another illustrative, alternate embodiment shown in FIG. 11 to be described, the laterally extending loop 66 may be configured as a small handle having a vertical loop formed therein in the manner of the handle of a coffee cup, instead of the laterally oriented loop 66. Such a handle would enable lifting of the tray insert 60 without the use of a separate handle tool like the resilient handle 80. These alternate configurations of the "loop" portion of the tray inserts 60, whether laterally oriented as shown in FIG. 10 or vertically oriented as shown in FIG. 11, would both permit the nesting of the tray inserts as described.

Referring to FIG. 7 there is illustrated a further use of the resilient handle 80 illustrated in FIG. 6, showing a tray insert 60 being lifted out and away from the slow cooker 27. It will also be apparent from FIG. 7 that one of the two tray inserts 60 may remain in place to be used alone.

Figure 8:
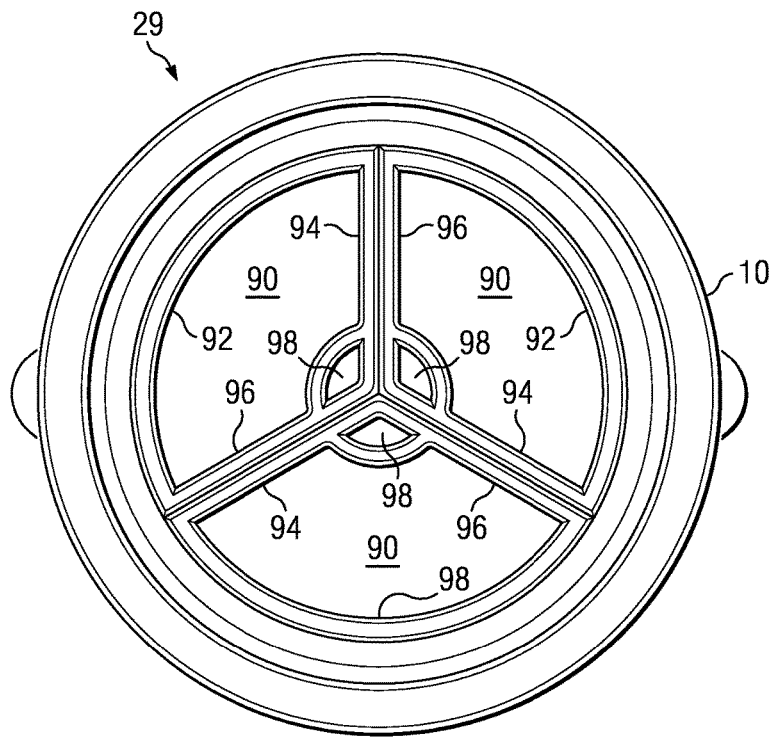
FIG. 8 illustrates a plan view of a slow cooker with its cover removed and an alternate embodiment of the nested trays embodiment of the present invention as installed in the slow cooker.

Referring to FIG. 8 there is illustrated a plan view of a slow cooker 29 with its cover removed and an alternate embodiment of the nested trays embodiment of the present invention as installed in the slow cooker 29. The slow cooker 29 is identical in all respects to the slow cookers of FIGS. 25 and 27 except for the particular adapter tray being shown in use with it. The embodiment of FIG. 8 shows an adapter formed of three identical tray inserts 90 nested together within the interior space of the slow cooker 29. Thus, three cooking basins are provided, each one having substantially vertical walls and configured to nest in side-by-side fashion when supported within the slow cooker 29. Each tray insert 90 includes a curved outside wall 92 opposite at least first and second inside walls 94, 96 adjacent to the curved wall 92 at respective ends thereof, the inside walls 94, 96 joining each other at an angle of approximately 120° at opposite ends thereof and further including at their joining a lateral lifting loop 98 protruding therefrom. The lateral lifting loop 98 is provided to enable use of a resilient handle 80 to be used to lift and move a tray insert 90 from within the slow cooker 29 or to place a tray insert 90 inside the slow cooker 29 in the same manner as illustrated in FIGS. 6 and 7 for the embodiment of FIG. 5.

Referring to FIG. 9 there is illustrated a perspective view of a stand for use with the embodiments of FIGS. 5, 6, 7, and 8. The stand 54 of FIG. 9 may be used in place of the several ledges shown in FIGS. 5 and 7 and described herein above. For example, since the present invention is adaptable without any modification to existing slow cookers, a stand configured for use with a particular slow cooker lacking such ledges may be a more suitable support for the tray insert 60, 90 adapters. The stand 54 includes a horizontal portion to support the tray inserts, at least three legs 56, and may be formed of plated or stainless steel wire or its equivalent. Various styles may be used, the one illustrated in FIG. 9 being exemplary.

Referring to FIG. 10, the tray insert 160 has a flat bottom, a curved outside wall 62 opposite a straight inside wall 64 attached to the curved wall 60 at respective ends thereof, the inside wall 64 further including at a first location a laterally extending lifting member 166 protruding therefrom and a laterally extending indentation 68 in the inside wall 64 at a second location adjacent to the 266 member. The member 166 of one tray 160 may be received within the indentation 68 of the second tray 160 when the first 160 and second 160 trays are nested together. The laterally extending member 166 may include features for securing a handle to it to permit lifting of the tray insert 160 with the use of a separate handle (not shown) having the corresponding features. In one example, the features in the laterally extending member 166 may include notches 170 therearound, as shown in FIG. 10.

Referring to FIG. 11, the tray insert 260 has a flat bottom, a curved outside wall 62 opposite a straight inside wall 64 attached to the curved wall 60 at respective ends thereof, the inside wall 64 further including at a first location a laterally extending, vertically oriented lifting loop 266 protruding therefrom and a laterally extending indentation 68 in the inside wall 64 at a second location adjacent to the 266 loop. The loop 266 of one tray 260 may be received within the indentation 68 of the second tray 260 when the first 260 and second 260 trays are nested together. The laterally extending, vertically oriented loop 266 permits lifting of a tray insert 260 without the use of a separate handle.

While the invention has been shown in only several of its forms to illustrate the principles of the invention, it is not thus limited but is susceptible to various changes and modifications without departing from the spirit thereof.

What is claimed is:

1. An adapter assembly for a slow cooker having a bottom and walls, and heating elements embedded in the walls and bottom, comprising:
   at least first and second identically shaped trays, each tray forming a separate basin, having substantially vertical walls configured to nest in side-by-side fashion when supported within the slow cooker to form a composite array for providing a divided cooking area;
   wherein each tray includes a curved outside wall opposite a straight inside wall attached to the curved wall at respective ends thereof, the inside wall further including at a first location a laterally extending lifting loop protruding therefrom and a laterally extending indentation in the inside wall at a second location adjacent to the loop, such that the loop of one tray is received within the indentation of a second tray when the first and second trays are nested together.

2. The adapter assembly of claim 1, including the limitations thereof, further comprising:
   a stand having a plurality of legs and configured for placement within the slow cooker on the bottom thereof to support the array of trays there within.

3. The adapter assembly of claim 2, including the limitations thereof, wherein:
   the stand having a plurality of legs is formed of a material selected from the group consisting of stainless steel, plated metal wire, coated metal wire, molded thermosetting plastic, and a ceramic material.

4. A handle for lifting a tray of the adapter assembly of claim 1, including the limitations thereof, comprising:
   a V-shaped tong formed of resilient wire and having an angled portion formed into a distal end of each leg of the V-shaped device such that when the distal ends of the tong may be squeezed together and inserted into the lateral lifting loop protruding from the straight sidewall of the tray and relaxed for connecting the handle to the tray for lifting it.

5. The adapter assembly of claim 1, including the limitations thereof, wherein:

the trays are formed of heat-resistant glass.

6. The adapter assembly of claim 1, including the limitations thereof, wherein:

the trays are formed of a heat resistant material selected from the group consisting of borosilicate glasses, whiteware ceramics, and thermosetting plastics.

7. The adapter assembly of claim 1, including the limitations thereof, further comprising:

a supporting ledge disposed at selected locations around an inside wall of the slow cooker, separated at intervals of at least 60° and intermediate the bottom of the slow cooker and the upper rim of the slow cooker, to support the at least first and second trays.

8. The adapter assembly of claim 1, including the limitations thereof, wherein:

the laterally extending lifting loop is formed such that the loop portion thereof is vertically oriented.

9. The adapter assembly of claim 1, including the limitations thereof, wherein:

the laterally extending loop is replaced by a laterally extending member such that the laterally extending member includes features for securing a lifting handle thereto.

10. The adapter assembly of claim 9, including the limitations thereof, wherein:

the laterally extending member includes notches for securing a lifting handle thereto.

11. The adapter assembly of claim 1, including the limitations thereof, comprising:

first, second and third identically shaped trays having substantially vertical walls and configured to nest in side-by-side fashion when supported within a slow cooker to form a composite array for providing a divided cooking area having three basins;

wherein each tray includes a curved outside wall opposite at least first and second straight inside walls adjacent to the curved wall at respective ends thereof, the inside walls joining each other at an angle of approximately 120° at opposite ends thereof and further including at their joining a lateral lifting loop protruding inward therefrom.

\* \* \* \* \*